(12) United States Patent
Kanemitsu et al.

(10) Patent No.: US 8,136,417 B2
(45) Date of Patent: Mar. 20, 2012

(54) SLIDING DEVICE

(75) Inventors: Hiroshi Kanemitsu, Toyota (JP); Masaharu Hatta, Toyota (JP)

(73) Assignee: Taiho Kogyo Co., Ltd., Toyota-Shi, Aichi (JP)

( * ) Notice: Subject to any disclaimer, the term of this patent is extended or adjusted under 35 U.S.C. 154(b) by 826 days.

(21) Appl. No.: 11/887,514

(22) PCT Filed: Jan. 18, 2006

(86) PCT No.: PCT/JP2006/300616
§ 371 (c)(1),
(2), (4) Date: Sep. 27, 2007

(87) PCT Pub. No.: WO2006/117901
PCT Pub. Date: Nov. 9, 2006

(65) Prior Publication Data
US 2009/0031894 A1    Feb. 5, 2009

(30) Foreign Application Priority Data
Apr. 27, 2005   (JP) .................................. 2005-130573

(51) Int. Cl.
*F16H 23/00* (2006.01)
*F16C 33/10* (2006.01)
(52) U.S. Cl. .......................................... 74/60; 384/293
(58) Field of Classification Search ............... 384/26, 384/27, 38, 42, 283, 284, 285, 625, 293; 92/71; 29/888.02
See application file for complete search history.

(56) References Cited

U.S. PATENT DOCUMENTS

| | | | |
|---|---|---|---|
| 4,420,986 A * | 12/1983 | Nakayama et al. | 74/60 |
| 6,289,785 B1 * | 9/2001 | Ikeda et al. | 92/71 |
| 6,404,590 B1 * | 6/2002 | Kuo et al. | 360/135 |
| 6,581,507 B2 * | 6/2003 | Mizutani et al. | 92/71 |
| 7,290,936 B2 * | 11/2007 | Tsuji et al. | 384/293 |
| 2002/0046647 A1 * | 4/2002 | Sugiura et al. | 92/71 |
| 2002/0104432 A1 * | 8/2002 | Shimo et al. | 92/71 |
| 2003/0005821 A1 * | 1/2003 | Ota et al. | 92/70 |

FOREIGN PATENT DOCUMENTS

| | | |
|---|---|---|
| JP | 53-129311 | 11/1978 |
| JP | 57-051976 | 3/1982 |
| JP | 59-221479 | 12/1984 |
| JP | 01-224481 | 9/1989 |
| JP | 02-130272 | 5/1990 |
| JP | 03-111522 | 5/1991 |
| JP | 10-153169 | 6/1998 |
| JP | 2001-279421 | 10/2001 |
| JP | 2001-280236 | 10/2001 |
| JP | 2002-317757 | 10/2002 |
| JP | 2003-042061 | 2/2003 |

* cited by examiner

*Primary Examiner* — Thomas R Hannon
*Assistant Examiner* — Phillip A Johnson
(74) *Attorney, Agent, or Firm* — Flynn, Thiel, Boutell & Tanis, P.C.

(57) ABSTRACT

A sliding device 1 includes a swash plate 3 rotated in association with a rotating shaft 2 and semispherical shoes 4 sliding on the swash plate 3.

The semispherical shoes 4 are formed of a ferrous material and the swash plate 3 is manufactured using high-strength brass as a material.

On a sliding surface 4A of the shoe 4, a large number of minute annular expandingly projecting parts 7' are formed by laser hardening and a lubricating oil passage 10' consisting of a reticular concave part is also formed.

Thereby, a sliding device 1 having excellent seizure resistance as compared with conventional sliding devices can be provided.

14 Claims, 6 Drawing Sheets

FIG.8

| EXAMPLE OF SHOE 4 | SURFACE TREATMENT | BASE MATERIAL (SUBSTRATE) |
|---|---|---|
| S1 | NO TREATMENT (HARDENING)<br>(1) Ni-P BASE HARD PLATING<br>(2) DIFFUSION TREATMENT SUCH AS NITRIDING, CARBONIZATION HARDENING, AND CARBONIZATION NITRIDING<br>(3) PLATING OF Sn, Sn ALLOY, SOLDER ALLOY, OR SILVER<br>(4) PLATING OF MANGANESE PHOSPHATE OR ZINC PHOSPHATE | HARDENABLE FERROUS MATERIAL (SUJ2) |
| S2 | Ni-P BASE HARD PLATING | ALUMINUM-SILICON ALLOY |
| S3 | DITTO | COPPER ALLOY (COPPER-ZINC BASE, COPPER-TIN BASE, COPPER-LEAD BASE, COPPER-BISMUTH BASE) |
| S4 | NO TREATMNT<br>(DIFFUSION TREATMENT SUCH AS NITRIDING, CARBONIZATION HARDENING, AND CARBONIZATION NITRIDING) | PURE TITANIUM, TITANIUM ALLOY |

FIG.9

| EXAMPLE OF SWASH PLATE 3 | SURFACE TREATMENT | BASE MATERIAL (BASIC MATERIAL +SUBSTRATE) |
|---|---|---|
| SW 1 | NO TREATMENT<br>(1) COATING OF THERMOSETTING RESIN+ SOLID LUBRICANT<br>(2) COATING OR IMPREGNATION OF SOLID LUBRICANT (MoS2, PTFE, GRAPHITE)<br>(3) PLATING OF Sn, Sn ALLOY, SOLDER ALLOY, OR SILVER | HIGH-STRENGTH BRASS |
| SW 2 | DITTO | FERROUS BASIC MATERIAL + COPPER ALLOY |
| SW 3 | NO TREATMENT<br>(1) COATING OF THERMOSETTING RESIN+ SOLID LUBRICANT<br>(2) COATING OR IMPREGNATION OF SOLID LUBRICANT (MoS2, PTFE, GRAPHITE)<br>(3) PLATING OF Sn, Sn ALLOY, SOLDER ALLOY, OR SILVER<br>(4) Ni-P BASE OR Ni-P-B BASE PLATING | ALUMINUM-SILICON ALLOY |
| SW 4 | DITTO | FERROUS BASIC MATERIAL + ALUMINUM-SILICON ALLOY |
| SW 5 | (1) COATING OF THERMOSETTING RESIN+ SOLID LUBRICANT<br>(2) COATING OR IMPREGNATION OF SOLID LUBRICANT (MoS2, PTFE, GRAPHITE)<br>(3) PLATING OF Sn, Sn ALLOY, SOLDER ALLOY, OR SILVER<br>(4) Ni-P BASE OR Ni-P-B BASE PLATING<br>(5) CARBON BASE HARD COATING (DLC, WC/C, CrN) | FERROUS BASIC MATERIAL (CAPABLE OF ALSO BEING HARDENED) |

SLIDING DEVICE

TECHNICAL FIELD

The present invention relates to a sliding device and, more particularly, to a sliding device suitable as a swash plate and shoes in, for example, a swash plate compressor.

BACKGROUND ART

Conventionally, a swash plate compressor is known that is provided with a swash plate provided rotatably and shoes having a sliding surface that slides on the swash plate (for example, Patent Documents 1 and 2).
Patent Document 1: Japanese Patent Laid-Open No. 10-153169
Patent Document 2: Japanese Patent Laid-Open No. 2002-317757

DISCLOSURE OF THE INVENTION

Problems to be Solved by the Invention

In recent years, the above-described swash plate compressors have been used under the condition of a high speed and high load and, moreover, under the condition of a small quantity of lubricating oil. Thus, the working conditions of the swash plate compressors have recently become increasingly harsh, so that there arises a problem in that the swash plate and shoes wear out heavily and, moreover, seizure of these members is liable to occur.

To improve the sliding characteristics of the shoe, a treatment such as a surface treatment or reforming has conventionally been performed on the sliding surface of the shoe. However, such a treatment brings about a drawback of an increased manufacturing cost of the shoe.

Means for Solving the Problems

In view of the above circumstances, the present invention provides a sliding device including a swash plate that is rotated in association with a rotating shaft and has a flat first sliding surface on at least one of the end surfaces, and a shoe having a second sliding surface that slides on the first sliding surface of the swash plate, characterized in that a ferrous material is used as a material for the shoe, a large number of minute hardened parts consisting of annular expandingly projecting parts are formed on the second sliding surface of the shoe and, further, any of the following items (a) to (e) is used as a material for the swash plate.
(a) high-strength brass
(b) a ferrous basic material coated with a copper alloy
(c) an aluminum-silicon alloy
(d) a ferrous basic material coated with an aluminum-silicon alloy
(e) a ferrous basic material Also, the present invention provides a sliding device including a swash plate that is rotated in association with a rotating shaft and has a flat first sliding surface on at least one of the end surfaces, and a shoe having a second sliding surface that slides on the first sliding surface of the swash plate, characterized in that an aluminum-silicon alloy is used as a material for the shoe, a large number of minute hardened parts consisting of annular expandingly projecting parts are formed on the second sliding surface of the shoe after the second sliding surface of the shoe has been subjected to Ni—P based hard plating and, further, any of the following items (a) to (e) is used as a material for the swash plate.
(a) high-strength brass
(b) a ferrous basic material coated with a copper alloy
(c) an aluminum-silicon alloy
(d) a ferrous basic material coated with an aluminum-silicon alloy
(e) a ferrous basic material Also, the present invention provides a sliding device including a swash plate that is rotated in association with a rotating shaft and has a flat first sliding surface on at least one of the end surfaces, and a shoe having a second sliding surface that slides on the first sliding surface of the swash plate, characterized in that a copper alloy is used as a material for the shoe, a large number of minute hardened parts consisting of annular expandingly projecting parts are formed on the second sliding surface of the shoe after the second sliding surface of the shoe has been subjected to Ni—P based hard plating and, further, any of the following items (a) to (e) is used as a material for the swash plate.
(a) high-strength brass
(b) a ferrous basic material coated with a copper alloy
(c) an aluminum-silicon alloy
(d) a ferrous basic material coated with an aluminum-silicon alloy
(e) a ferrous basic material Further, the present invention provides a sliding device including a swash plate that is rotated in association with a rotating shaft and has a flat first sliding surface on at least one of the end surfaces, and a shoe having a second sliding surface that slides on the first sliding surface of the swash plate, characterized in that
pure titanium or a titanium alloy is used as a material for the shoe, a large number of minute hardened parts consisting of annular expandingly projecting parts are formed on the second sliding surface of the shoe and, further, any of the following items (a) to (e) is used as a material for the swash plate.
(a) high-strength brass
(b) a ferrous basic material coated with a copper alloy
(c) an aluminum-silicon alloy
(d) a ferrous basic material coated with an aluminum-silicon alloy
(e) a ferrous basic material

Advantages of the Invention

According to the above-described configuration, a sliding device having excellent seizure resistance can be provided.

BEST MODE FOR CARRYING OUT THE INVENTION

The present invention will now be described with reference to the examples shown in the accompanying drawings. In FIG. 1, a sliding device 1 is provided in a housing of a swash plate compressor. The sliding device 1 is made up of a swash plate 3 attached tiltingly to a rotating shaft 2 pivotably supported in the housing and a plurality of shoes 4 sliding on the swash plate 3.

The swash plate 3 is formed into a disc shape and both end surfaces of the swash plate 3 form flat sliding surfaces 3A on which the shoes 4 slide.

On the other hand, the shoe 4 is formed into a semispherical shape as a whole and has a sliding surface 4A sliding on the sliding surface 3A of the swash plate 3 and a convex surface 4B having a semispherical shape.

In the housing of the swash plate compressor, a plurality of pistons 5 are arranged so as to be in parallel with and surround the rotating shaft 2. In an arcuate notch part 5A formed at one end of each of the pistons 5, a set of two shoes 4 is slidably held. The notch part 5A in this state is arranged so as to wrap the outer peripheral portion of the swash plate 3 and to bring the sliding surfaces 4A of the shoes 4 of each set into contact with the sliding surfaces 3A of the swash plate 3.

When the rotating shaft 2 is rotated, the swash plate 3 rotates and the sliding surfaces 3A, which are the end surfaces of the swash plate 3, and the sliding surfaces 4A of the shoes 4 of each set slide with each other. Accordingly, each of the pistons 5 advances and retreats in the axial direction via the shoes 4 of each set.

The above-described configuration is the same as that of the conventionally known sliding device.

The shoe 4 of this example is formed of SUJ2, which is a ferrous material, and the substantially flat sliding surface 4A consisting of an end plate has a slightly convex shape such that the center side thereof rises slightly (about 2 μm) from the outer peripheral edge. Thereby, when the sliding surface 4A slides on the sliding surface 3A of the swash plate 3, lubricating oil is prone to be drawn between the sliding surfaces 4A and 3A.

As described later, in this example, the whole region of the sliding surface 4A of the shoe 4 is hardened by being irradiated with laser beams and the swash plate 3 is improved and, also, the seizure resistance of the sliding surfaces 3A and 4A of both of the members is improved, in turn improving the seizure resistance of the whole of the sliding device 1.

The hardening process of the sliding surface 4A of the shoe 4 and the subsequent fabricating processes are explained. First, as shown in FIGS. 2 and 3, the whole region of the sliding surface 4A, which is the end surface of the shoe 4 (parent material) manufactured of SUJ2 into a semispherical shape, is irradiated with a YAG laser in such a manner that many circles 6 having the same diameter are drawn.

The diameter of each of the circles 6 is set at 0.8 mm and each of the circle 6 is formed so that the center thereof is located at the position of the intersection at the time when longitudinal and transverse parallel lines are drawn at the same intervals P in the whole region of the sliding surface 4A. In this example, the interval P is set at 1.1 mm.

In this example, the output of the YAG laser applied to the sliding surface 4A is 50 W and a condenser lens is adjusted so that the YAG laser focuses at a position 2 mm deep from the top surface of the sliding surface 4A. Therefore, the YAG laser is applied to the top surface of the sliding surface 4A in a defocused state.

The location of each of the circles 6 on the sliding surface 4A irradiated with the laser in this manner projects expandingly in an annular form as shown in FIGS. 4 and 5 to form an annular expandingly projecting part 7, and a tapered concave part 8 concaved inwardly is formed adjacently on the inside in the radial direction of the annular expandingly projecting part 7. That is to say, by applying the laser to the sliding surface 4A so as to form the circle 6, a crater-shaped annular expandingly projecting part 7 is formed at the location of the circle 6 irradiated with the laser. The height of the annular expandingly projecting part 7 and the depth of the concave part 8 are each approximately 1 to 3 μm. Further, on the outside in the radial direction of the annular expandingly projecting part 7, there is formed a reticular concave part 10 that connects with each other and reaches the outer periphery of the sliding surface 4A.

The annular expandingly projecting part 7 and a portion 11 on the inside in the depth direction of the annular expandingly projecting part 7 (a portion on the upside from a broken line 9) are hardened so that the hardness thereof is about Hv 100 increased from Hv 750, which is the hardness of the parent material of the shoe 4.

On the other hand, a portion on the inside in the radial direction of the annular expandingly projecting part 7 and a portion on the outside of the annular expandingly projecting part 7 (portions of the concave part 8 and the reticular concave part 10) on the sliding surface 4A are annealed to form non-hardened portions. These portions have a hardness that is about Hv 100 lower than that of the parent material.

In this example, by applying the laser to the sliding surface 4A of the shoe 4 so that a large number of the circles 6 are drawn as described above, first, a large number of the minute annular expandingly projecting parts 7 and concave parts 8 and the reticular concave part 10 are formed.

Subsequently, all of the annular expandingly projecting parts 7 on the sliding surface 4A are removed once by lapping to make the sliding surface 4A smooth, and then the sliding surface 4A is buffed, by which the fabrication is finished.

After the fabrication has been finished in this manner, as shown in FIG. 6, annular expandingly projecting parts 7', which are the same as the aforementioned annular expandingly projecting parts 7, are formed at the locations of the circles 6 (locations of the annular expandingly projecting parts 7) irradiated with the laser over the whole region of the sliding surface 4A and, also, concave parts 8', which are the same as the aforementioned concave parts 8, are each formed on the inside in the radial direction of each of the annular expandingly projecting parts 7'. Further, on the outside in the radial direction of each of the annular expandingly projecting parts 7', there is formed a lubricating oil passage 10' consisting of a reticular concave part that allows lubricating oil to flow.

The reason for this process is as described below. The initially formed annular expandingly projecting parts 7 are removed by lapping and, then, the sliding surface 4A is buffed, by which the hardness of the portion 11 on the inside in the depth direction of the annular expandingly projecting part 7 is increased as compared with the hardness of the peripheral portion thereof. Therefore, the portion having a high hardness remains in an annular form, so that the annular expandingly projecting parts 7', the concave parts 8', and the lubricating oil passage 10' are formed.

In this example, hardened portions are formed by a large number of the annular expandingly projecting parts 8' formed as described above. Also, the concave parts 8' function as storage parts for storing the lubricating oil and the lubricating oil passage 10' is configured so that the lubricating oil can flow therein.

As shown in FIG. 6, the height h of each of the annular expandingly projecting parts 7' (the depth of the concave part 8') is 0.05 to 0.3 μm, and the maximum width W of the cross-section (dimension in the radial direction of the foot part) is about 0.3 mm. Also, the diameter D1 of the peak portion of the annular expandingly projecting part 7' is 0.8 mm. The diameter D2 of the outer peripheral edge of the annular expandingly projecting part 7' is about 1.1 mm and the diameter D3 of the inner peripheral edge of the annular expandingly projecting part 7' is about 0.5 mm.

As described above, in this example, the shoe 4 using SUJ2, which is a ferrous material, as a parent material (basic material) is subjected to the above-described laser hardening of the sliding surface 4A and the subsequent lapping and buffing operations.

In this example, contrary to the shoe 4 configured as described above, the swash plate 3 is configured as described below in terms of the basic material and surface treatment thereof. The swash plate 3 uses a high-strength brass as a basic material and the surfaces of the swash plate 3, which are the sliding surfaces 3A, are not subjected to special surface treatment such as plating.

FIG. 7 shows the result of a seizure resistance test, the test being conducted on the above-described sliding device 1 of this example and a sliding device using conventional shoes.

In FIG. 7, for the conventional shoe, the sliding surface is not hardened by the laser and, therefore, the sliding surface is flat. As a swash plate used as the mating member of the conventional shoe, a swash plate formed of a brass material that was the same as in this example was used.

The conditions of the seizure resistance test are as follows:
(Test Conditions)
Number of revolutions of swash plate: increased by 1000 rpm per minute at nine steps: maximum number of revolutions 9000 rpm (circumferential speed 38 m/s)
Surface pressure: preload 2.7 MPa, increased by 2.7 MPa per minute: until seizure occurs
Oil mist quantity: 0.05 to 0.25 g/min, nozzle position fixed
Oil: refrigerator oil
Seizing condition: shaft torque higher than 4.0 N·m The number of revolutions of the swash plate 3 was increased under the above-described condition in the state in which the sliding surface of the shoe 4 was brought into contact under pressure with the swash plate 3. On the other hand, the surface pressure at the time when the shoe 4 was brought into contact under pressure with the swash plate 3 was increased under the above-described condition. When the shaft torque applied to the swash plate 3 exceeded 4.0 N·m, it was judged that seizure occurred. The same holds true for the conventional sliding device.

As can be understood from the test shown in FIG. 7, the seizure load of the conventional shoe and sliding device was not higher than 5 MPa, whereas that of the shoe and sliding device of this example was not lower than 22 MPa. The shoe 4 of this example clearly has excellent seizure resistance as compared with the conventional shoe.

As described above, according to this example, a shoe 4 and sliding device 1 having an excellent seizure resistance can be provided.

Also, the sliding surface 4A of the shoe 4 of this example is formed with a large number of annular expandingly projecting parts 7', and also the concave part 8' for storing lubricating oil is formed on the inside in the radial direction of each of the annular expandingly projecting parts 7' so that the lubricating oil is stored in the concave part 8'. Moreover, at the position on the outside adjacent to the annular expandingly projecting part 7', the lubricating oil passage 10' consisting of the reticular concave part is formed. Therefore, the load capacity of the sliding surface 4A of the shoe 4 can be increased and, in turn, the shoe 4 and the sliding device 1 having excellent wear resistance can be provided.

In the above-described example, the sliding surface 4A of the shoe 4 using SUJ2 as a basic material is subjected to the above-described laser hardening and subsequent fabrications. However, the combination of the basic material used for the shoe 4 and the surface treatment of the sliding surface 4A thereof as shown in FIG. 8 can be adopted.

In FIG. 8, S1 indicates the shoe 4 of the above-described example. In the above-described example, the sliding surface 4A of the basic material is not especially subjected to surface treatment before the above-described laser hardening. However, before the laser is applied to the sliding surface 4A to harden it, the whole region of the surface of the sliding surface 4A may be hardened, or in place of the hardening, the whole region of the surface of the sliding surface 4A may be subjected to the following surface treatment: (1) a Ni—P based hard plating or (2) a diffusion treatment such as nitriding, carbonization hardening, and carbonization nitriding may be performed. Further, other types of surface treatment, (3) plating of any of tin, tin alloy, solder alloy, and silver may be adopted, or (4) plating of either of manganese phosphate and zinc phosphate may be adopted.

In the case where the sliding surface 4A of the basic material shown in this example is subjected to surface treatment of the above item (1) or (2), after the surface treatment of item (1) or (2) has been performed on the sliding surface 4A of the basic material, the aforementioned laser hardening is performed. In this case, the surface of the sliding surface 4A is hardened by the surface treatment of item (1) or (2).

Also, when the sliding surface 4A of the basic material shown in this example is subjected to surface treatment of the above item (3) or (4), before the surface treatment of item (3) or (4) is performed on the sliding surface 4A, the aforementioned laser hardening, lapping, and buffing are performed and, thereafter, the surface treatment of item (3) or (4) is performed on the sliding surface 4A.

S2 in FIG. 8 indicates a second example of the shoe 4. The shoe 4 of the second example uses an aluminum-silicon alloy as a basic material and the surface of the sliding surface 4A is subjected to Ni—P based hard plating. In this case, after the surface treatment has been performed on the sliding surface 4A of the basic material, the laser hardening, lapping, and buffing are performed as described above.

Also, S3 indicates a third example of the shoe 4. The shoe 4 of the third example uses a copper alloy as a basic material and the surface of the sliding surface 4A is subjected to Ni—P based hard plating. In this case, after the surface treatment has been performed on the surface of the basic material, the aforementioned laser hardening, lapping, and buffing are performed.

Further, S4 indicates a fourth example of the shoe 4. The shoe 4 of the fourth example uses pure titanium or a titanium alloy as a basic material and surface treatment is not specially performed. However, the surface of the sliding surface 4A may be subjected to any diffusion treatment (surface treatment) such as nitriding, carbonization hardening and carbonization nitriding. In this case, after the surface treatment has been performed on the surface of the basic material, the aforementioned laser hardening, lapping and buffing are performed.

In the above-described example, the swash plate 3 uses high-strength brass as a basic material and surface treatment is not specially performed on the sliding surfaces 3A thereof. However, the combination of the basic material used for the swash plate 3 and the surface treatment of the sliding surfaces 3A thereof, as shown in FIG. 9, can be adopted.

In FIG. 9, SW1 indicates the swash plate 3 of the above-described example, which uses high-strength brass as a basic material. In the swash plate 3 using high-strength brass as a basic material, any of the following surface treatments of the sliding surfaces 3A may be adopted: (1) coating of a thermosetting resin and a solid lubricant on the surface thereof, (2) coating or impregnation of a solid lubricant ($MoS_2$, PTFE, graphite), and (3) plating of any of tin, tin alloy, solder alloy, and silver.

Also, as a second example of the swash plate 3, as indicated by SW2 in FIG. 9, a ferrous material is used as a basic material and the surface thereof is coated with a copper alloy by thermal spraying or the like, and the surface treatment of any of the above items (1) to (3) is performed.

Further, as a third example of the swash plate 3, as indicated by SW3 in FIG. 9, an aluminum-silicon alloy is used as a basic material, and the surface treatment of any of the items (1) to (3) and (4): Ni—P based or Ni—P—B based plating may be performed.

Also, as a fourth example of the swash plate 3, as indicated by SW4 in FIG. 9, the surface of the ferrous basic material is coated with an aluminum-silicon alloy by thermal spraying or the like, and the surface treatment of any of the above items (1) to (4) is performed.

Further, as a fifth example of the swash plate 3, as indicated by SW5 in FIG. 9, a ferrous basic material is used and any of the surface treatment of any of the items (1) to (4) and (5): carbon-based hard coating, such as diamond-like carbon (DLC), tungsten carbide (WC/C) or chrome nitride (CrN), is performed. In the fifth example, after the ferrous basic material has been hardened, the surface treatment of any of the aforementioned items (1) to (5) may be performed.

As described above, the shoe 4 is broadly divided into four examples as shown in FIG. 8 and, on the other hand, the swash plate 3 is broadly divided into five examples as shown in FIG. 9.

Therefore, by combining the shoes 4 shown in FIG. 8 with the swash plates 3 shown in FIG. 9, various types of the sliding devices 1 can be provided. However, it is important to avoid sliding between the same kinds of materials.

For the shoe 4 of the above-described examples, each of the annular expandingly projecting parts 7' is formed at the position of the intersection of longitudinal and transverse parallel lines. However, as shown in FIG. 10, each of the annular expandingly projecting parts 7' may be formed at the position of a zigzag arrangement.

BRIEF DESCRIPTION OF THE DRAWINGS

FIG. 8 is a table showing the relationship between a basic material and surface treatment in examples of a shoe in accordance with the present invention;

FIG. 9 is a table showing the relationship between a basic material and surface treatment in examples of a swash plate in accordance with the present invention.

DESCRIPTION OF SYMBOLS

Figure 1:
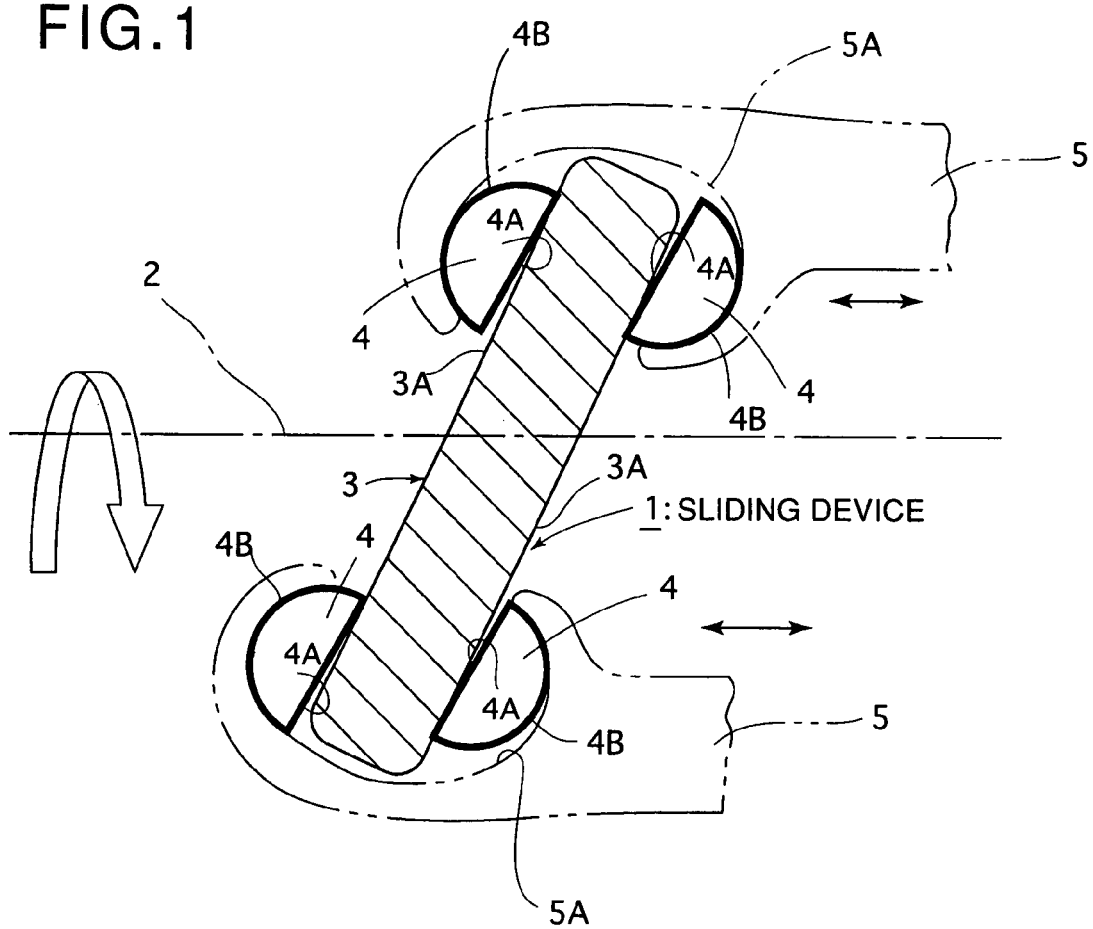
FIG. 1 is a sectional view showing one example of the present invention.
Figure 2:
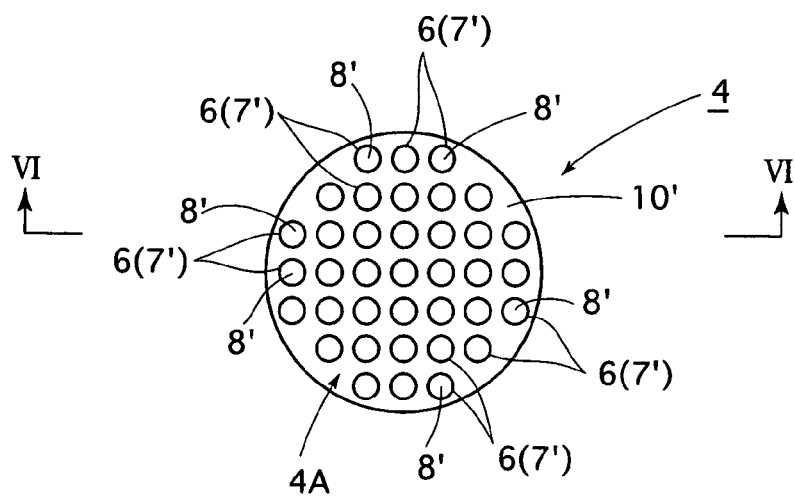
FIG. 2 is a front view of a sliding surface of a shoe shown in FIG. 1.
Figure 3:
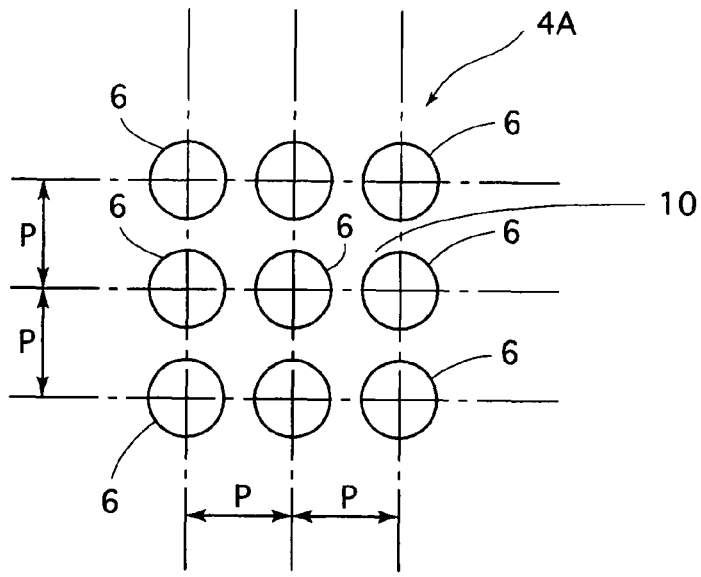
FIG. 3 is an enlarged view of an essential portion shown in FIG. 2.
Figure 4:
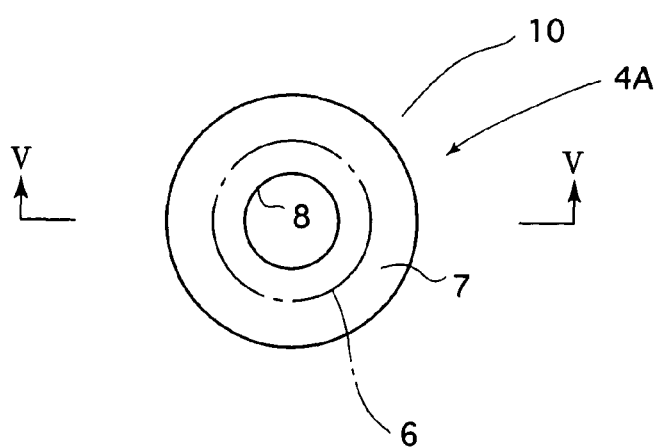
FIG. 4 is an enlarged view of the essential portion of FIG. 3.
Figure 5:
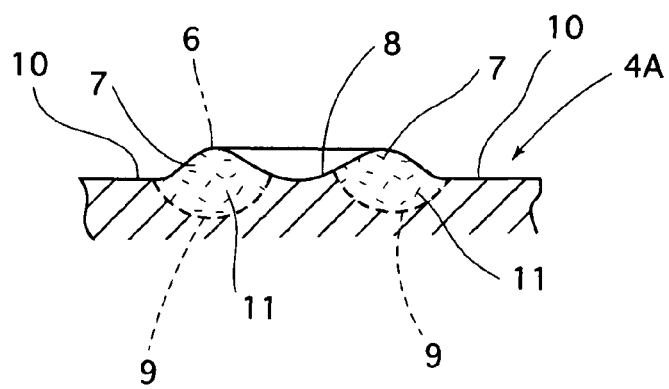
FIG. 5 is a sectional view taken along the line V-V of FIG. 4.
Figure 6:
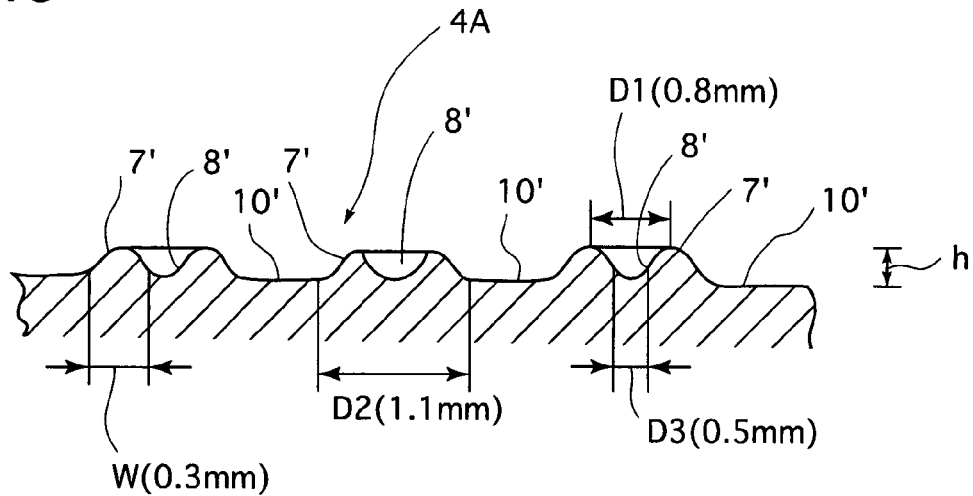
FIG. 6 is a sectional view of an essential portion taken along the line VI-VI of FIG. 2.
Figure 7:
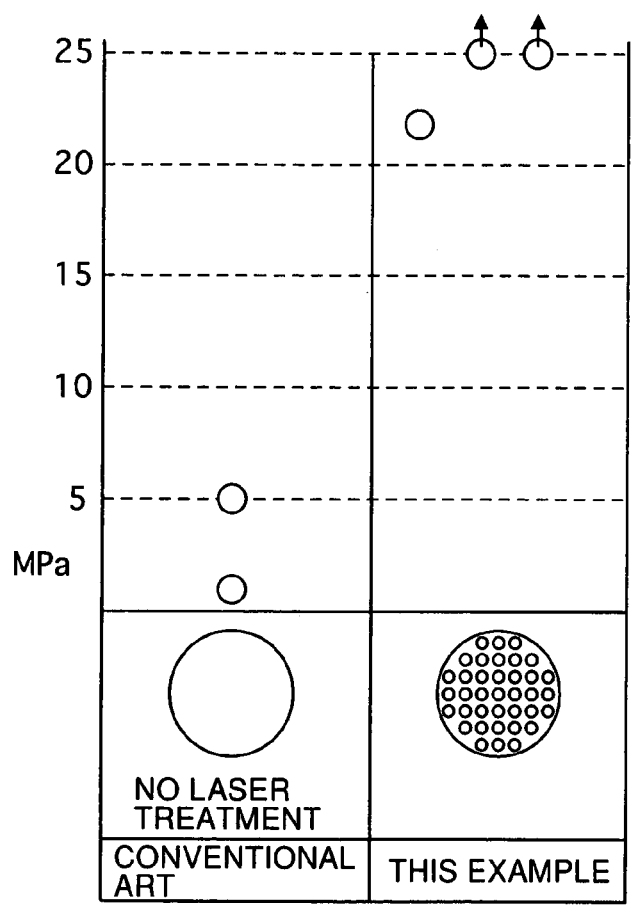
FIG. 7 is a chart showing the test results of the conventional art and an example of the present invention.
Figure 10:
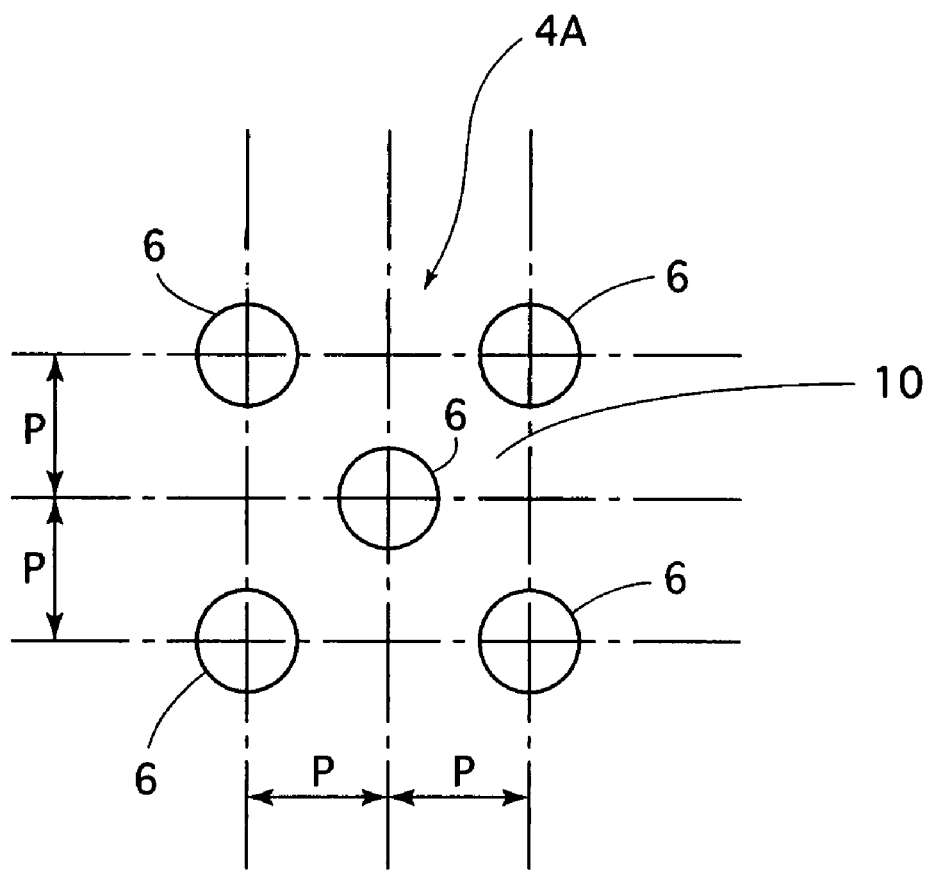
FIG. 10 is a front view of an essential portion showing another example of the present invention.

1 . . . sliding device
2 . . . rotating shaft
3 . . . swash plate
3A . . . sliding surface (first sliding surface)
4 . . . shoe
4A . . . sliding surface (second sliding surface)
7' . . . annular expandingly projecting part (hardened part)

The invention claimed is:

1. A sliding device comprising a swash plate that is rotated in association with a rotating shaft and has a flat first sliding surface on at least one of its end surfaces and a shoe having a second sliding surface that slides on the first sliding surface of the swash plate, characterized in that
   a ferrous material is used as a base material for the shoe, a large number of minute hardened parts consisting of annular expandingly projecting parts are formed on the second sliding surface of the shoe having a higher hardness than the base material and one of the following items (a) to (e) is used as a material for the swash plate:
(a) high-strength brass;
(b) a ferrous basic material coated with a copper alloy;
(c) an aluminum-silicon alloy;
(d) a ferrous basic material coated with an aluminum-silicon alloy; and
(e) a ferrous basic material, wherein each annular expandingly projecting part has an interior for storing a lubricating oil and an exterior forming a lubricating oil passageway for flowing the lubricating oil therethrough which both have lower hardnesses than the annular expandingly projecting part, wherein the height of the annular expandingly projecting parts is equal to the depth of the interior of the annular expandingly projecting parts and is from 0.05-0.3 µm.

2. The sliding device according to claim 1, characterized in that the annular expandingly projecting parts are formed after the second sliding surface of the shoe has been subjected to Ni—P based hard plating.

3. The sliding device according to claim 1, characterized in that the annular expandingly projecting parts are formed after the second sliding surface of the shoe has been subjected to diffusion treatment by nitriding, carbonization hardening or carbonization nitriding.

4. The sliding device according to claim 1, characterized in that the second sliding surface of the shoe is subjected to plating by a member selected from the group consisting of tin, tin alloy, solder alloy, silver, manganese phosphate and zinc phosphate after the annular expandingly projecting parts have been formed.

5. The sliding device according to claim 1, characterized in that
   the surface of the first sliding surface of the swash plate is subjected to surface treatment by one of the items (1) to (3) described below,
(1) coating of an admixture of a thermosetting resin and a fixing lubricant,
(2) coating or impregnation of a solid lubricant, and
(3) plating with one of tin, a tin alloy, a solder alloy and silver.

6. The sliding device according to claim 1, characterized in that
   the surface of the first sliding surface of the swash plate is subjected to surface treatment by either of Ni—P based plating and Ni—P—B based plating.

7. The sliding device according to claim 1, characterized in that
   the surface of the first sliding surface of the swash plate is subjected to surface treatment by coating with one of diamond-like carbon, tungsten carbide and chrome nitride.

8. A sliding device according to claim 1, wherein the diameter of an inner peripheral edge of the annular expandingly projecting parts is 0.5 mm and the diameter of an outer peripheral edge of the annular expandingly projecting parts is 1.1 mm.

9. A sliding device comprising a swash plate that is rotated in association with a rotating shaft and has a flat first sliding surface on at least one of its end surfaces and a shoe having a second sliding surface that slides on the first sliding surface of the swash plate, characterized in that an aluminum-silicon alloy is used as a base material for the shoe, a large number of minute hardened parts consisting of annular expandingly projecting parts are formed on the second sliding surface of the shoe having a higher hardness than the base material after the second sliding surface of the shoe has been subjected to Ni—P based hard plating and one of the following items (a) to (e) is used as a material for the swash plate:

(a) high-strength brass;
(b) a ferrous basic material coated with a copper alloy;
(c) an aluminum-silicon alloy;
(d) a ferrous basic material coated with an aluminum-silicon alloy; and
(e) a ferrous basic material, wherein each annular expandingly projecting part has an interior for storing a lubricating oil and an exterior forming a lubricating oil passageway for flowing the lubricating oil therethrough which both have lower hardnesses than the annular expandingly projecting part, wherein the height of the annular expandingly projecting parts is equal to the depth of the interior of the annular expandingly projecting parts and is from 0.05-0.3 μm.

10. A sliding device according to claim 9, wherein the diameter of an inner peripheral edge of the annular expandingly projecting parts is 0.5 mm and the diameter of an outer peripheral edge of the annular expandingly projecting parts is 1.1 mm.

11. A sliding device comprising a swash plate that is rotated in association with a rotating shaft and has a flat first sliding surface on at least one of its end surfaces and a shoe having a second sliding surface that slides on the first sliding surface of the swash plate, characterized in that a copper alloy is used as a base material for the shoe, a large number of minute hardened parts consisting of annular expandingly projecting parts are formed on the second sliding surface of the shoe having a higher hardness than the base material after the second sliding surface of the shoe has been subjected to Ni—P based hard plating and one of the following items (a) to (e) is used as a material for the swash plate:

(a) high-strength brass;
(b) a ferrous basic material coated with a copper alloy;
(c) an aluminum-silicon alloy;
(d) a ferrous basic material coated with an aluminum-silicon alloy; and
(e) a ferrous basic material, wherein each annular expandingly projecting part has an interior for storing a lubricating oil and an exterior forming a lubricating oil passageway for flowing the lubricating oil therethrough which both have lower hardnesses than the annular expandingly projecting part, wherein the height of the annular expandingly projecting parts is equal to the depth of the interior of the annular expandingly projecting parts and is from 0.05-0.3 μm.

12. A sliding device according to claim 11, wherein the diameter of an inner peripheral edge of the annular expandingly projecting parts is 0.5 mm and the diameter of an outer peripheral edge of the annular expandingly projecting parts is 1.1 mm.

13. A sliding device comprising a swash plate that is rotated in association with a rotating shaft and has a flat first sliding surface on at least one of its end surfaces and a shoe having a second sliding surface that slides on the first sliding surface of the swash plate, characterized in that pure titanium or a titanium alloy is used as a base material for the shoe, a large number of minute hardened parts consisting of annular expandingly projecting parts are formed on the second sliding surface of the shoe having a higher hardness than the base material and one of the following items (a) to (e) is used as a material for the swash plate:

(a) high-strength brass;
(b) a ferrous basic material coated with a copper alloy;
(c) an aluminum-silicon alloy;
(d) a ferrous basic material coated with an aluminum-silicon alloy; and
(e) a ferrous basic material, wherein each annular expandingly projecting part has an interior for storing a lubricating oil and an exterior forming a lubricating oil passageway for flowing the lubricating oil therethrough which both have lower hardnesses than the annular expandingly projecting part, wherein the height of the annular expandingly projecting parts is equal to the depth of the interior of the annular expandingly projecting parts and is from 0.05-0.3 μm.

14. A sliding device according to claim 13, wherein the diameter of an inner peripheral edge of the annular expandingly projecting parts is 0.5 mm and the diameter of an outer peripheral edge of the annular expandingly projecting parts is 1.1 mm.

* * * * *